US008876038B2

(12) United States Patent
Yoeli

(10) Patent No.: US 8,876,038 B2
(45) Date of Patent: Nov. 4, 2014

(54) DUCTED FAN FOR VTOL VEHICLES WITH SYSTEM AND METHOD TO REDUCE ROLL MOMENTS

(75) Inventor: Raphael Yoeli, Tel Aviv (IL)

(73) Assignee: Urban Aeronautics Ltd., Yavne (IL)

( * ) Notice: Subject to any disclaimer, the term of this patent is extended or adjusted under 35 U.S.C. 154(b) by 440 days.

(21) Appl. No.: 13/252,278

(22) Filed: Oct. 4, 2011

(65) Prior Publication Data
US 2012/0080564 A1    Apr. 5, 2012

Related U.S. Application Data

(60) Provisional application No. 61/389,933, filed on Oct. 5, 2010.

(51) Int. Cl.
B64C 29/00    (2006.01)
B64C 27/20    (2006.01)
B64C 19/00    (2006.01)

(52) U.S. Cl.
CPC ............... *B64C 27/20* (2013.01); *B64C 19/00* (2013.01)
USPC ..................................................... 244/23 A

(58) Field of Classification Search
USPC .......... 244/23 A, 23 B, 23 C, 12.2, 12.3, 12.5
See application file for complete search history.

(56) References Cited

U.S. PATENT DOCUMENTS

| 1,287,076 | A | 12/1918 | Moses |
| 2,077,471 | A | 4/1937 | Fink |
| 2,138,999 | A | 12/1938 | Clark |
| 2,242,201 | A | 5/1941 | Woods |
| 2,273,724 | A | 2/1942 | Nelson et al. |
| D155,044 | S | 8/1949 | Gluhareff |
| 2,709,947 | A | 6/1955 | Woods |
| 2,734,699 | A | 2/1956 | Lippisch |

(Continued)

FOREIGN PATENT DOCUMENTS

| EP | 0 236583 | 9/1987 |
| EP | 0 553490 | 8/1993 |

(Continued)

OTHER PUBLICATIONS

Edward D. Flinn, "Revolutionary X-Hawk Hovers Near Success," Aerospace America, Jul. 2003, pp. 26-28.

(Continued)

*Primary Examiner* — Rob Swiatek
*Assistant Examiner* — Marc Burgess
(74) *Attorney, Agent, or Firm* — Nixon & Vanderhye P.C.

(57) ABSTRACT

A ducted fan for a VTOL vehicle includes a substantially cylindrical duct having an inlet at an upper end and an outlet at a lower end, and an air mover unit located within the substantially cylindrical duct. The duct also includes inner and outer wall portions and a substantially annular upper lip connecting the inner and outer wall portions, thus defining the inlet. The substantially annular upper lip has opposed fore and aft portions and opposed side portions and is provided with at least first and second openings, respectively, at each of the opposed side portions. The first and second arrays of openings permit flow of air into at least first and second respective chambers formed within the duct, the first and second chambers connected by at least one passageway to thereby enable substantial equalization of surface pressure at the opposed side portions of the substantially annular upper lip.

10 Claims, 12 Drawing Sheets

(56) References Cited

U.S. PATENT DOCUMENTS

| | | |
|---|---|---|
| 2,734,705 A | 2/1956 | Robertson |
| 2,777,649 A | 1/1957 | Williams |
| 2,812,636 A | 11/1957 | Kadosch et al. |
| 2,899,149 A | 8/1959 | Breguet |
| 2,930,544 A | 3/1960 | Howell |
| 2,936,969 A | 5/1960 | Griffith et al. |
| 2,939,649 A | 6/1960 | Shaw |
| 2,951,661 A | 9/1960 | Dorman et al. |
| 2,955,780 A | 10/1960 | Hulbert |
| 2,968,453 A | 1/1961 | Bright |
| 2,973,921 A | 3/1961 | Price |
| 2,975,676 A | 3/1961 | Butler |
| 2,988,301 A | 6/1961 | Fletcher |
| 3,033,493 A | 5/1962 | Wilde et al. |
| 3,039,537 A | 6/1962 | Heidelberg |
| 3,058,693 A | 10/1962 | Doak |
| 3,082,977 A | 3/1963 | Arlin |
| 3,088,695 A | 5/1963 | Clark |
| 3,090,581 A | 5/1963 | Einarsson |
| 3,116,898 A | 1/1964 | Clark et al. |
| 3,136,500 A | 6/1964 | Kerry |
| 3,139,244 A | 6/1964 | Bright |
| 3,161,374 A | 12/1964 | Allred et al. |
| 3,167,273 A | 1/1965 | Calderon |
| 3,174,573 A | 3/1965 | Chaplin |
| 3,179,353 A | 4/1965 | Peterson |
| 3,179,354 A | 4/1965 | Alvarez-Calderon |
| 3,181,810 A | 5/1965 | Olson |
| 3,184,183 A | 5/1965 | Piasecki |
| 3,187,817 A | 6/1965 | Colley |
| 3,198,082 A | 8/1965 | Kerris |
| 3,201,067 A | 8/1965 | Meyerhoff |
| 3,203,645 A | 8/1965 | Shaw |
| 3,223,354 A | 12/1965 | Seibold et al. |
| 3,224,712 A | 12/1965 | Taylor et al. |
| 3,231,221 A | 1/1966 | Platt |
| 3,244,246 A | 4/1966 | Weiland |
| 3,259,343 A | 7/1966 | Roppel |
| 3,262,511 A | 7/1966 | Carr |
| 3,262,657 A | 7/1966 | Anker-Holth |
| 3,265,329 A | 8/1966 | Postelson-Apostolescu |
| 3,276,528 A | 10/1966 | Tucknott et al. |
| 3,289,977 A | 12/1966 | Staats |
| 3,350,035 A | 10/1967 | Schlieben |
| 3,360,217 A | 12/1967 | Trotter |
| 3,383,074 A | 5/1968 | Coplin |
| 3,384,327 A | 5/1968 | Postelson-Apostolescu |
| 3,397,852 A | 8/1968 | Katzen |
| 3,397,854 A | 8/1968 | Reyle |
| 3,454,238 A | 7/1969 | Goodson |
| 3,463,420 A | 8/1969 | Butler et al. |
| 3,481,559 A | 12/1969 | Postelson-Apostolescu |
| 3,519,224 A | 7/1970 | Boyd et al. |
| 3,559,921 A | 2/1971 | Timperman |
| 3,580,530 A | 5/1971 | Wada |
| 3,584,810 A | 6/1971 | Velton |
| 3,606,208 A | 9/1971 | Postelson-Apostolescu |
| 3,614,030 A | 10/1971 | Moller |
| 3,627,235 A | 12/1971 | Lippisch |
| 3,633,849 A | 1/1972 | Kling |
| 3,665,809 A | 5/1972 | Darlington et al. |
| 3,713,748 A | 1/1973 | Langley |
| 3,752,417 A | 8/1973 | Lagace |
| 3,827,527 A | 8/1974 | Bertelsen |
| 3,873,049 A | 3/1975 | Horsdal |
| 3,904,155 A | 9/1975 | Chavis |
| 3,912,201 A | 10/1975 | Bradbury |
| 3,955,780 A | 5/1976 | Postelson |
| 3,972,490 A | 8/1976 | Zimmermann et al. |
| 4,022,405 A | 5/1977 | Peterson |
| 4,043,421 A | 8/1977 | Smith |
| 4,071,207 A | 1/1978 | Piasecki et al. |
| 4,149,688 A | 4/1979 | Miller, Jr. |
| 4,171,784 A | 10/1979 | Eickmann |
| 4,194,707 A | 3/1980 | Sharpe |
| 4,469,294 A | 9/1984 | Clifton |
| 4,505,442 A | 3/1985 | Kirsch et al. |
| 4,505,443 A | 3/1985 | Bradfield et al. |
| 4,537,372 A | 8/1985 | Forizs |
| 4,598,890 A | 7/1986 | Herzog et al. |
| 4,701,602 A | 10/1987 | Schaefer et al. |
| 4,754,940 A | 7/1988 | Deter |
| 4,757,962 A | 7/1988 | Grant |
| 4,765,568 A | 8/1988 | Carl et al. |
| 4,795,111 A | 1/1989 | Moller |
| 4,796,836 A | 1/1989 | Buchelt |
| 4,824,048 A | 4/1989 | Kim |
| 4,828,203 A | 5/1989 | Clifton et al. |
| 4,834,319 A | 5/1989 | Ewy et al. |
| 4,856,732 A | 8/1989 | Eickmann |
| 4,880,071 A | 11/1989 | Tracy |
| 4,892,274 A | 1/1990 | Pohl et al. |
| 4,917,332 A | 4/1990 | Patterson, Jr. |
| 4,934,629 A | 6/1990 | Brant |
| 4,982,914 A | 1/1991 | Eickmann |
| 5,064,143 A | 11/1991 | Bucher |
| 5,101,927 A | 4/1992 | Murtuza |
| 5,141,173 A | 8/1992 | Lay |
| 5,209,428 A | 5/1993 | Bevilaqua et al. |
| 5,297,761 A | 3/1994 | Kendall, Jr. et al. |
| 5,303,879 A | 4/1994 | Bucher |
| 5,395,073 A | 3/1995 | Rutan et al. |
| 5,407,150 A | 4/1995 | Sadleir |
| 5,419,514 A | 5/1995 | Ducan |
| 5,454,531 A | 10/1995 | Melkuti |
| 5,505,407 A | 4/1996 | Chiappetta |
| 5,666,483 A | 9/1997 | McClary |
| 5,738,302 A | 4/1998 | Freeland |
| 5,746,390 A | 5/1998 | Chiappetta et al. |
| 5,806,805 A | 9/1998 | Elbert et al. |
| 5,841,079 A * | 11/1998 | Parente ............. 244/134 B |
| 5,890,441 A | 4/1999 | Swinson et al. |
| 6,050,520 A | 4/2000 | Kirla |
| 6,089,501 A | 7/2000 | Frost |
| 6,105,901 A | 8/2000 | Ulanoski et al. |
| 6,119,985 A | 9/2000 | Clapp et al. |
| 6,170,778 B1 | 1/2001 | Cycon et al. |
| 6,254,032 B1 | 7/2001 | Bucher |
| 6,270,038 B1 | 8/2001 | Cycon et al. |
| 6,318,668 B1 | 11/2001 | Ulanoski et al. |
| 6,371,406 B1 | 4/2002 | Corcoran |
| 6,382,559 B1 | 5/2002 | Sutterfield et al. |
| 6,402,088 B1 | 6/2002 | Syrovy et al. |
| 6,431,494 B1 | 8/2002 | Kinkead et al. |
| 6,446,911 B1 | 9/2002 | Yount et al. |
| 6,457,670 B1 | 10/2002 | Geranio |
| 6,464,166 B1 | 10/2002 | Yoeli |
| 6,474,598 B2 | 11/2002 | Carter, Jr. |
| 6,520,449 B2 | 2/2003 | Illingworth |
| 6,561,456 B1 | 5/2003 | Devine |
| 6,568,630 B2 | 5/2003 | Yoeli |
| 6,616,094 B2 | 9/2003 | Illingworth |
| 6,644,598 B2 | 11/2003 | Glezer et al. |
| 6,648,270 B1 | 11/2003 | Burnett et al. |
| 6,704,624 B2 | 3/2004 | Ortega et al. |
| 6,708,920 B2 | 3/2004 | Fukuyama |
| 6,745,977 B1 | 6/2004 | Long et al. |
| 6,751,530 B2 | 6/2004 | Seifert et al. |
| D496,606 S | 9/2004 | Sanders, Jr. |
| 6,808,140 B2 | 10/2004 | Moller |
| 6,817,570 B2 | 11/2004 | Yoeli |
| 6,824,095 B2 | 11/2004 | Mao |
| 6,834,832 B2 | 12/2004 | Jamgarov |
| 6,843,447 B2 | 1/2005 | Morgan |
| 6,883,748 B2 | 4/2005 | Yoeli |
| 6,886,776 B2 | 5/2005 | Wagner et al. |
| 6,892,979 B2 | 5/2005 | Milde |
| 6,892,980 B2 | 5/2005 | Kawai |
| 6,913,226 B2 | 7/2005 | Huynh |
| 6,926,322 B2 | 8/2005 | Browne et al. |
| 6,974,105 B2 | 12/2005 | Pham |
| 7,246,769 B2 | 7/2007 | Yoeli |
| 7,249,732 B2 | 7/2007 | Sanders, Jr. et al. |
| 7,267,300 B2 | 9/2007 | Heath et al. |

(56) References Cited

U.S. PATENT DOCUMENTS

| | | |
|---|---|---|
| 7,275,712 B2 | 10/2007 | Yoeli |
| 7,364,115 B2 | 4/2008 | Parks et al. |
| 7,717,368 B2 | 5/2010 | Yoeli |
| 7,789,342 B2 | 9/2010 | Yoeli |
| 7,806,362 B2 | 10/2010 | Yoeli |
| 7,857,253 B2 | 12/2010 | Yoeli |
| 7,918,416 B2 | 4/2011 | Yoeli |
| 7,946,528 B2 | 5/2011 | Yoeli |
| 8,020,804 B2 | 9/2011 | Yoeli |
| 8,056,866 B2 | 11/2011 | De Roche |
| 8,066,220 B2 | 11/2011 | Kirstein |
| 8,342,441 B2 | 1/2013 | Yoeli |
| 2002/0060267 A1 | 5/2002 | Yavnai |
| 2002/0161488 A1 | 10/2002 | Guillemin et al. |
| 2002/0179773 A1* | 12/2002 | Breer et al. ............... 244/134 R |
| 2003/0062442 A1 | 4/2003 | Milde, Jr. |
| 2003/0062443 A1 | 4/2003 | Wagner et al. |
| 2003/0080242 A1 | 5/2003 | Kawai |
| 2003/0085319 A1 | 5/2003 | Wagner et al. |
| 2003/0127559 A1 | 7/2003 | Walmsley |
| 2003/0195673 A1 | 10/2003 | Foch et al. |
| 2004/0026563 A1 | 2/2004 | Moller |
| 2004/0104303 A1 | 6/2004 | Mao |
| 2005/0029407 A1 | 2/2005 | Pohl et al. |
| 2005/0040283 A1 | 2/2005 | Frazer |
| 2005/0065669 A1 | 3/2005 | Roux et al. |
| 2005/0109875 A1 | 5/2005 | Ouellette et al. |
| 2005/0151026 A1* | 7/2005 | Meyer ............................ 244/204 |
| 2006/0097107 A1 | 5/2006 | Parks et al. |
| 2006/0113426 A1 | 6/2006 | Yoeli |
| 2006/0226281 A1 | 10/2006 | Walton |
| 2006/0231675 A1 | 10/2006 | Bostan |
| 2007/0018034 A1 | 1/2007 | Dickau |
| 2007/0034738 A1 | 2/2007 | Sanders, Jr. et al. |
| 2007/0158494 A1 | 7/2007 | Burrage |
| 2008/0054121 A1 | 3/2008 | Yoeli |
| 2009/0159757 A1 | 6/2009 | Yoeli |
| 2010/0051740 A1 | 3/2010 | Yoeli |
| 2010/0051753 A1 | 3/2010 | Yoeli |
| 2010/0076625 A1 | 3/2010 | Yoeli |
| 2010/0140415 A1* | 6/2010 | Goossen .................... 244/23 A |
| 2010/0270419 A1 | 10/2010 | Yoeli |
| 2011/0042509 A1 | 2/2011 | Bevirt et al. |
| 2011/0042510 A1 | 2/2011 | Bevirt et al. |
| 2011/0049306 A1 | 3/2011 | Yoeli |
| 2011/0049307 A1 | 3/2011 | Yoeli |
| 2011/0168834 A1 | 7/2011 | Yoeli |
| 2011/0174920 A1 | 7/2011 | Yoeli |
| 2012/0032032 A1 | 2/2012 | De Roche |

FOREIGN PATENT DOCUMENTS

| | | |
|---|---|---|
| EP | 0 922925 | 6/1999 |
| GB | 935884 | 9/1963 |
| GB | 951186 | 3/1964 |
| IT | 666076 A | 8/1964 |
| SE | 184314 | 6/1963 |
| WF | 2004/031876 A1 | 4/2004 |
| WO | 01/93039 A1 | 12/2001 |
| WO | 02/096750 A2 | 12/2002 |
| WO | 02/098732 A2 | 12/2002 |
| WO | 03/016134 A1 | 2/2003 |
| WO | 2004/012993 A1 | 2/2004 |
| WO | 2004/065208 A2 | 8/2004 |
| WO | 2005/039972 A2 | 5/2005 |
| WO | 2006/072960 A2 | 7/2006 |
| WO | 2006/131920 | 12/2006 |
| WO | 2007/052271 A2 | 5/2007 |
| WO | 2007/099543 A2 | 9/2007 |
| WO | 2007/129313 A2 | 11/2007 |
| WO | 2008/065654 A2 | 6/2008 |
| WO | 2008/065664 A2 | 6/2008 |
| WO | 2008/135973 A2 | 11/2008 |
| WO | 2009/077968 A2 | 6/2009 |
| WO | 2009/147630 A1 | 12/2009 |
| WO | 2010/026517 A2 | 3/2010 |
| WO | 2010/067325 A2 | 6/2010 |

OTHER PUBLICATIONS

Raymond L. Robb, "Driving on Air: $20^{th}$ Century Flying Carpets," Vertiflite, vol. 51, No. 1, Spring 2005, pp. 2-11.

Urban Aeronautics Ltd., "The X-Hawk VTOL Utility Vehicle"—product description and specifications, 2004.

Piasecki Aircraft Corporation Product Description and History for Piasecki VZ-8 VTOL research vehicle (undated).

De Lorean DMC-12, alleged to have first been produced in 1981 (images available from Wikipedia, the free encyclopedia, at http://en.wikipedia.org/wiki/De_Lorean_DMC-12).

International Search Report for International Application No. PCT/IL02/00417 (now WO 02/096750), dated May 23, 2003, published Oct. 2, 2003.

Written Opinion in International Application No. PCT/IL02/00417 (now WO 02/096750), Aug. 19, 2003.

International Preliminary Examination Report for International Application No. PCT/IL02/00417 (now WO 02/096750), Oct. 20, 2003.

Corrected International Preliminary Examination Report for International Application No. PCT/IL02/00417 (now WO 02/096750), Jul. 25, 2004.

International Search Report for International Application No. PCT/IL02/000439 (now WO 2002/098732), dated Apr. 28, 2003, published Mar. 18, 2004.

International Preliminary Examination Report in International Application No. PCT/IL02/000439 (now WO 2002/098732), Jul. 26, 2004.

International Search Report for International Application No. PCT/IL02/00682 (now WO 03/016134 (Yoeli)), dated Dec. 6, 2002.

International Search Report for International Application No. PCT/IL03/00640 (now WO 2004/012993 (Yoeli)), dated Jan. 2, 2004.

International Search Report for International Application No. PCT/IL03/00786 (now WO 2004/031876), Feb. 9, 2004.

International Search Report for International Application No. PCT/IL04/00984 (now WO 2005/039972 (Yoeli)), dated Dec. 6, 2005, published Jan. 26, 2006.

Written Opinion of the International Searching Authority in International Application No. PCT/IL04/00984 (now WO 2005/039972 (Yoeli)), dated Dec. 6, 2005.

International Preliminary Report on Patentability in International Application No. PCT/IL04/00984 (now WO 2005/039972 (Yoeli)), dated May 1, 2006.

Written Opinion/Search Report of the International Searching Authority in International Application No. PCT/IL06/00032 (now WO 2006/072960 (Yoeli)), dated Sep. 11, 2006.

International Preliminary Report on Patentability in International Application No. PCT/IL06/00032 (now WO 2006/072960 (Yoeli)), dated Sep. 11, 2006.

International Search Report for International Application No. PCT/IL06/00663 (now WO 2006/131920) (Yoeli) dated Dec. 19, 2006.

Written Opinion of the International Searching Authority in International Application No. PCT/IL06/00663 (now WO 2006/131920) (Yoeli) dated Dec. 19, 2006.

International Search Report for International Application No. PCT/IL06/01264 (now WO 2007/052271 A2) (Yoeli) dated Aug. 5, 2008.

Written Opinion of the International Searching Authority in International Application No. PCT/IL06/01264 (now WO 2007/052271 A2) (Yoeli) dated Aug. 5, 2008.

Written Opinion and Search Report of the International Searching Authority in International Application No. PCT/IL07/00271 (now WO 2007/099543 A2) (Yoeli) dated Oct. 28, 2008.

International Search Report for International Application No. PCT/IL07/00544 (now WO 2007/129313) (Yoeli) dated Jul. 7, 2008.

Written Opinion of the International Searching Authority in International Application No. PCT/IL07/00544 (now WO 2007/129313) (Yoeli) dated Jul. 7, 2008.

(56) References Cited

OTHER PUBLICATIONS

International Search Report for International Application No. PCT/IL0701465 (now WO 2008/065654) (Yoeli) dated Sep. 30, 2008.
Written Opinion of the International Searching Authority in International Application No. PCT/IL0701465 (now WO 2008/065654) (Yoeli) dated Sep. 30, 2008.
Written Opinion and Search Report of the International Searching Authority in International Application No. PCT/IL07/01475 (now WO 2008/065664 A2) (Yoeli) dated Sep. 2, 2008.
Corrected Written Opinion and Search Report of the International Searching Authority in International Application No. PCT/IL07/01475 (now WO 2008/065664 A2) (Yoeli) dated Jul. 27, 2009.
International Search Report for International Application No. PCT/IL08/00575 (now WO 2008/135973) (Yoeli) dated Oct. 28, 2008.
Written Opinion of the International Searching Authority in International Application No. PCT/IL08/00575 (now WO 2008/135973) (Yoeli) dated Oct. 28, 2008.
Written Opinion and International Search Report of the International Searching Authority in International Application No. PCT/IB08/055301 (now WO 2009/077968) (Yoeli) dated Aug. 14, 2009.
Written Opinion and International Search Report of the International Searching Authority in International Application No. PCT/IB09/052346 (Yoeli) (now WO2009-147630 A1) dated Oct. 20, 2009.
Written Opinion and International Search Report of the International Searching Authority in International Application No. PCT/IB09/053768 (Yoeli) (now WO2010-026517 A2) dated Mar. 3, 2010.
Written Opinion and International Search Report of the International Searching Authority in International Application No. PCT/IB09/55656 (now WO 2010-067325 A2) dated Sep. 30, 2010.

\* cited by examiner

DUCTED FAN FOR VTOL VEHICLES WITH SYSTEM AND METHOD TO REDUCE ROLL MOMENTS

This application claims priority to U.S. Provisional Application No. 61/389,933 filed Oct. 5, 2010, the entire contents of which is hereby incorporated by reference.

This invention relates primarily to VTOL vehicle design and, more specifically, to ducted-fan configurations for VTOL vehicles.

BACKGROUND OF THE INVENTION

A typical Vertical Take Off and Landing (VTOL) vehicle may have one or more ducted fan units along or parallel to a longitudinal axis of the vehicle. Ducted fans have several advantages over free rotors (i.e., rotors not enclosed within ducts), the most prominent of which is the ducted fan's thrust augmentation that is attained when the incoming air accelerates over a suitably designed duct inlet lip, causing low pressure that acts upon the upper lip surface, creating up to 25-30% of additional thrust as compared to a free rotor.

Unfortunately, such augmentation comes at a price, mainly in the form of considerable rolling and pitching moments that are produced as a result of sideslip (i.e., sideward translational motion) or wind gusts.

VTOL vehicles that rely on ducted fans for lift and that need to operate in gusty wind conditions, must combat rolling moments that can interfere with the vehicle's operation and stability. One method that is advocated by Yoeli (U.S. Pat. No. 6,464,166 B1) is to use either a plurality of parallel, spaced, control vanes pivotally mounted to, and across, the inlet end of the duct, or a combination of two rows or groups of rotatable control vanes, one row at the duct inlet and one row at the duct exit (or outlet). These rows or groups of control vanes, each located at a distance from the center of gravity of the duct that is approximately half the depth of the duct (i.e., the vertical distance between the duct inlet and outlet), are, when rotated, able to produce rolling moments in a direction that is parallel to the vanes' axes of rotation, thereby opposing the adverse rolling moments caused by the lateral motion of the vehicle or alternatively, by a side-blowing wind when the vehicle is in hover. As this sideward motion increases, the vanes need to be rotated an increased amount until they reach the limit of the force that they can produce, with a consequent limit on the resistance to lateral wind or on the vehicle motion velocities. However, it has been discovered that adding vanes about the exit side of the duct may increase the total rolling moment acting on the duct.

Another way of enhancing the resistance to side winds is increasing the effectiveness of the control vanes as advocated by Yoeli (PCT/IB2009/055656) by increasing the distance between the upper (or inlet) control vanes and the vehicle's center of gravity and/or the lower (or outlet) row or group of control vanes, if installed, and designing the inlet side of the duct to affect the shape of the flow field in the vicinity of the duct inlet so that the flow into the duct can be made more uniform. With this added uniformity of flow, the control vanes, when mounted outside the duct, would be able to benefit from having a larger moment arm but would still be exposed to relatively high inflow velocities (a desired effect), in spite of being either completely or partially outside the boundaries of the duct.

Another way of coping with side winds as advocated by Yoeli (PCT/IL2007/001465) is designing selectively operated openings at the side walls of the duct preferably between the planes of the upper and lower vanes. The potential benefit of these side openings is the reduction of the sensitivity of the ducted fan to side airflow causing for example rolling moments. However, these methods have limits and a method is therefore desired for increasing the resistance of the duct to roll moments in order to enhance the ducted fan's ability to move sideways, perpendicular to the vanes' longitudinal axes or to resist side gusts and forces.

BRIEF DESCRIPTION OF THE INVENTION

One way of reducing the roll moment (caused by side airflows) is by equalizing the pressures on the duct lips, hence equalizing the upward forces acting over the upwind and downwind lips of the duct, by perforating the duct lips and inter connecting the opposite lips enclosures (or compartments) to create a uniform pressure at both duct sides. Another way of reducing the roll moment especially when vanes or other surfaces are incorporated in the duct is by locating the openings in the side walls of the duct about the outlet side of the duct, as will be explained below.

Accordingly, in one exemplary but non-limiting embodiment, there is provided a ducted fan for a VTOL vehicle comprising a substantially cylindrical duct having an inlet at an upper end and an outlet (or exit) at a lower end and an air mover unit (e.g., a rotor, propeller or fan); and, at least one arrangement of perforations (or holes) on the duct lips at either side of the duct, the arrangements connected to enable internal flow of air between them in order to equalize the pressure at the counter side lips of the duct.

In another exemplary but nonlimiting example, the perforations mentioned hereinabove can be adjusted from various open to close positions in order to prevent dust, debris or other outside bodies from entering the duct.

The invention also relates to a method of equalizing pressures, hence lift forces, at the upwind and downwind counter side lips of a ducted fan unit comprising an open-ended duct having an inlet and an outlet and an air mover unit, the method comprising: (a) perforating the lips of the duct at both upwind and downwind sides; and (b) connecting the enclosures of both lips to create equal pressure between them.

In another exemplary but nonlimiting example, there is provided a ducted fan for a VTOL vehicle comprising a substantially cylindrical duct having an inlet at an upper end and an outlet at a lower end and an air mover unit; and, at least an arrangement of vanes located about the outlet end of the duct, the vanes extending substantially parallel to a longitudinal axis of the VTOL vehicle; and, an opening in at least one side wall of the duct close to the outlet end of the duct to allow through airflow thereby reducing the moment produced by the said vanes as result of the asymmetric flow through the duct due to side wind. The opening may be provided with a barrier (or cover) to affect the airflow yielding various forces and moments, and also may be shaped to improve its aerodynamic profile.

The invention also relates to a method of reducing moments acting on a VTOL vehicle in flight, the VTOL vehicle having at least one ducted fan, the ducted fan having an inlet and an outlet and an air mover unit supported in the duct, between the inlet and the outlet; an arrangement of vanes located at least about the outlet of the duct, the vanes extending substantially parallel to a longitudinal axis of the VTOL vehicle, the method comprising: (a) making an opening in at least one side wall of the duct about the outlet end of the duct; and (b) allowing airflow through the opening to deflect the airflow blown from the upper inlet end to the lower outlet end of the duct yielding reduced moments.

Exemplary embodiments of the invention will now be described in greater detail in connection with the drawings identified below.

DETAILED DESCRIPTION OF THE INVENTION

Figure 1A:
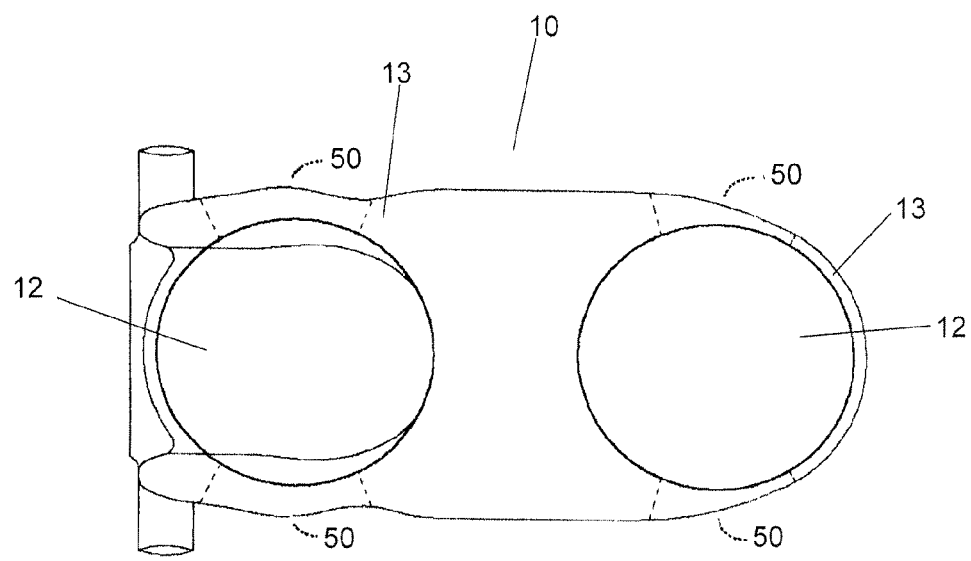
FIG. 1a-d are schematic views of a VTOL ducted fan vehicle with openings in the walls of the ducts.
Figure 1B:
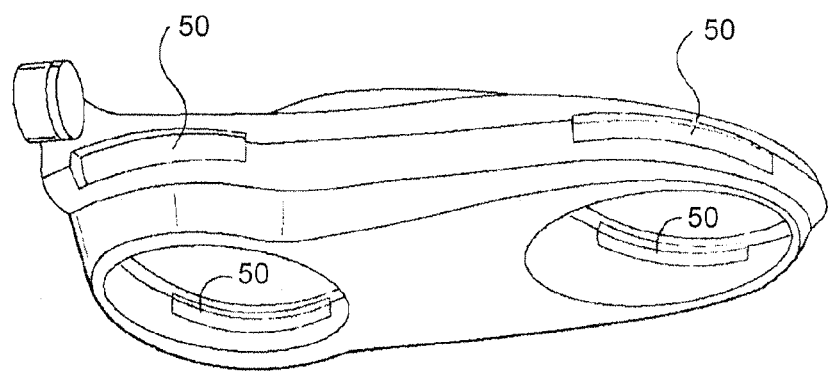

FIGS. 1a-b schematically illustrate top and perspective views of a ducted fan vehicle 10 which has two closed forward and aft ducts 12, inside of which is mounted an air mover unit which may include a rotor (or propeller or fan) (not shown) which draws air into the duct via an inlet at the top of the duct, the air exiting at an outlet at the bottom of the duct. The side walls 13 of the forward and or the aft ducts may have openings 50 which are at between the planes of the top inlet and bottom outlet. Such openings can be advantageous when the vehicle is flying sideways or in gusty wind conditions being subject to side wind forces. One potential benefit of these side openings by possible air flowing through them is reducing the sensitivity of the ducted fan to side winds causing for example undesired roll moments. The openings may be fixedly open or selectively operated to monitor the through airflow as required. They can be of various sizes shapes and opening and closing features and mechanisms. However, although the side openings improve the tolerance of the duct to side forces and moments conditions, they have a detrimental effect on its thrust augmentation (or lift augmentation), thus reducing the lift force of the duct. This detriment is caused by the location of the openings or their upper part closer to the inlet lip thereby allowing inside airflow to enter the duct also from the side wall, which consequently reduces the inside mass airflow over the lip.

Figure 1C:
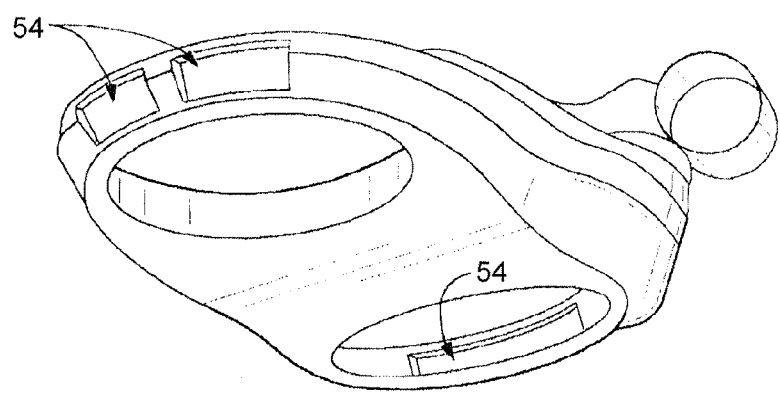

FIG. 1c illustrates a perspective view of a ducted fan vehicle similar to the vehicles illustrated in FIGS. 1a-b hereinabove but with openings 54 at the forward wall of the forward duct and the aft wall of the aft duct. Such openings can be advantageous in forward flight enhancing forward speed and reducing undesirable duct lip pitching moments by providing an alternative passage for the air thereby reducing the mass flow over the duct lips, which is the main cause of said pitching moments.

Figure 1D:
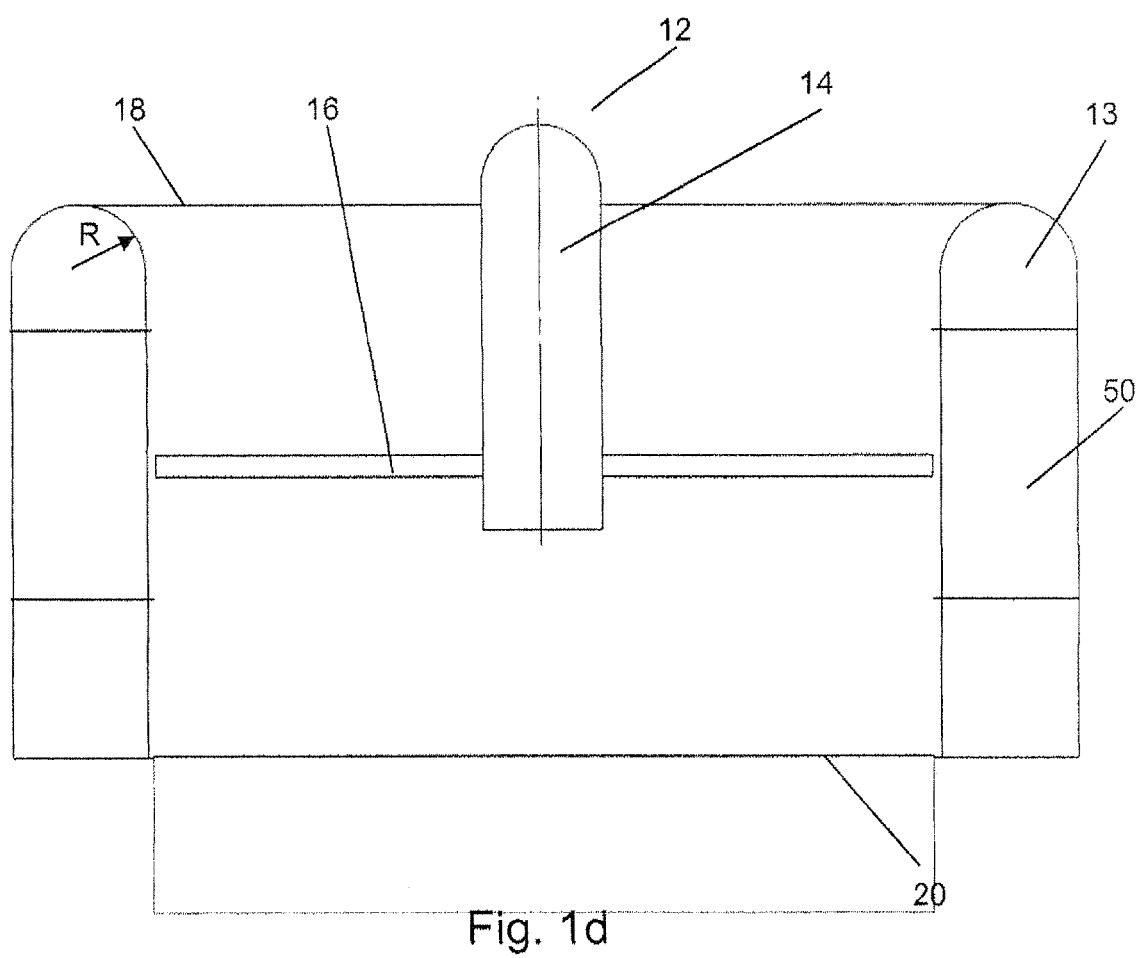

FIG. 1d shows schematically a cross section through the ducted fan of a VTOL vehicle 10 comprising an open-ended generally cylindrical duct 12, having a duct wall 13 and duct inlet lip of roughly radius R (though in many cases the lip geometric profile consists of a curve with varying radii), inside of which is mounted an air mover unit 14 which may be driven by either a powerplant or a gearbox (not shown, and located inside or outside the duct). The air mover unit 14 may include a rotor (or propeller or fan) 16 which draws air into the duct via an inlet 18, the air exiting the duct at an outlet 20. The side walls 13 of the forward and or the aft ducts may have openings 50 which are at between the planes of the upper inlet 18 and lower outlet 20. As further explained in FIG. 2a below, side winds cause asymmetric flows in the duct. Typically, the influence of the openings on reducing the moments created by asymmetric air flows over the upper lips of the duct increases as the openings are located closer to the lips. However, the upper location of the openings has a negative effect on the duct lift augmentation and also a minimal influence on resisting detrimental forces and moments created at the lower vanes installed about the outlet side of the duct.

Figure 2A:
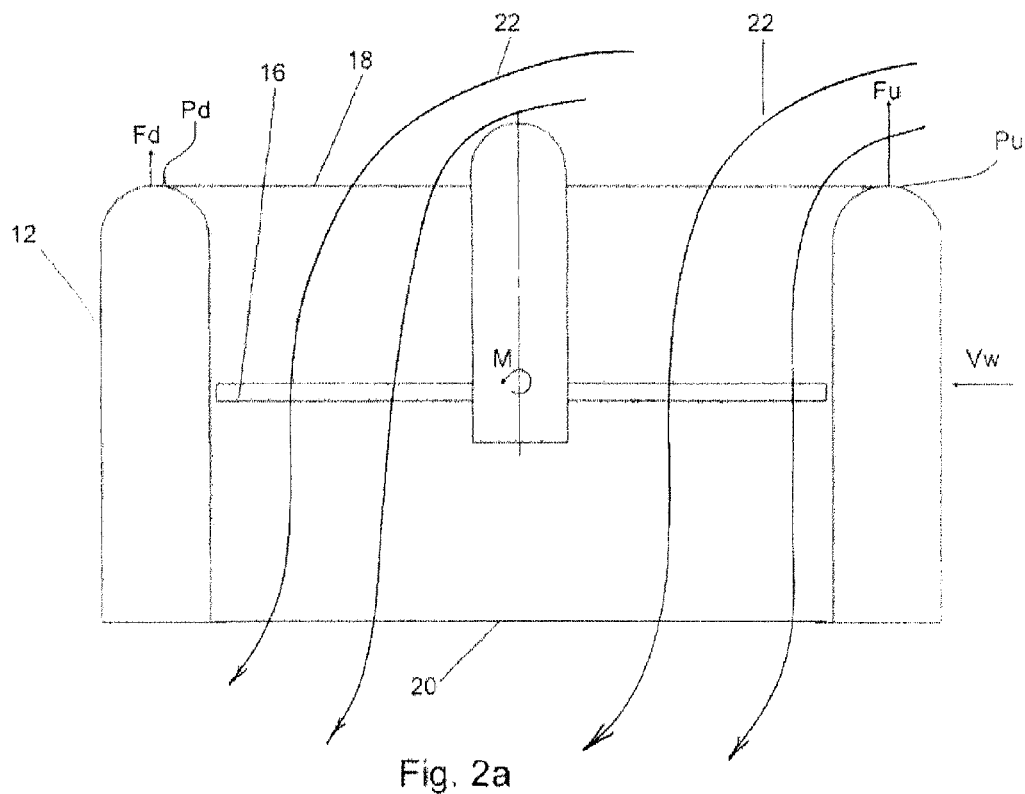
FIGS. 2a-2d are cross sections and top views of ducted fan units with and without perforations and connections between duct lips.

FIG. 2a shows schematically a cross section through the ducted fan of the VTOL vehicle of FIG. 1d but without the openings 50 in the duct walls. It also shows schematically the typical flow pattern that exists around and inside a ducted fan when the VTOL vehicle encounters side wind flow Vw either due to its lateral motion sideways and or due to side wind gusts. As can be seen by the streamlines 22, due to the contribution of the side wind Vw to the airflow caused by the suction force of the rotor 16, the airflow velocity about the upwind side of the duct upper lip is larger in magnitude than the airflow velocity about the duct upper lip at the downwind side. Consequently, and consistent with Bernoulli's principle, the pressure Pu at the upwind side upper duct lip is lower than the pressure Pd at the downwind side, hence the resulting upward lift force Fu at the upwind side lip is larger in magnitude than the lift force Fd at the downwind side, which difference creates a rolling moment M on the duct.

Figure 2B:
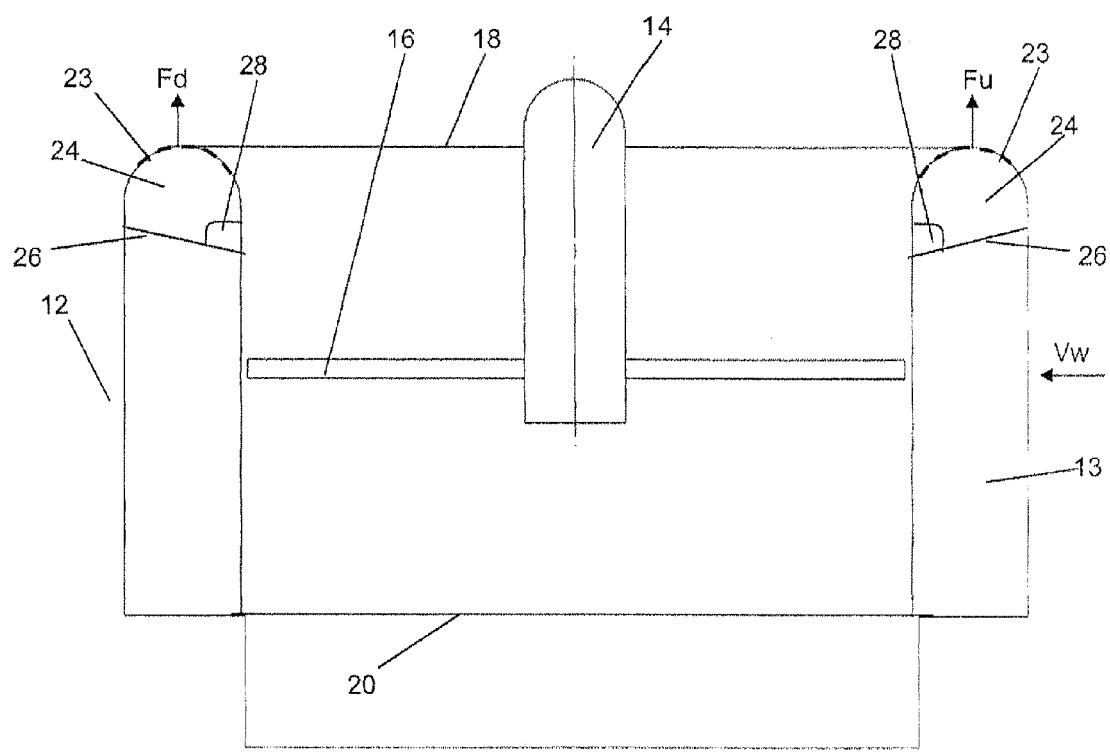
Figure 2C:
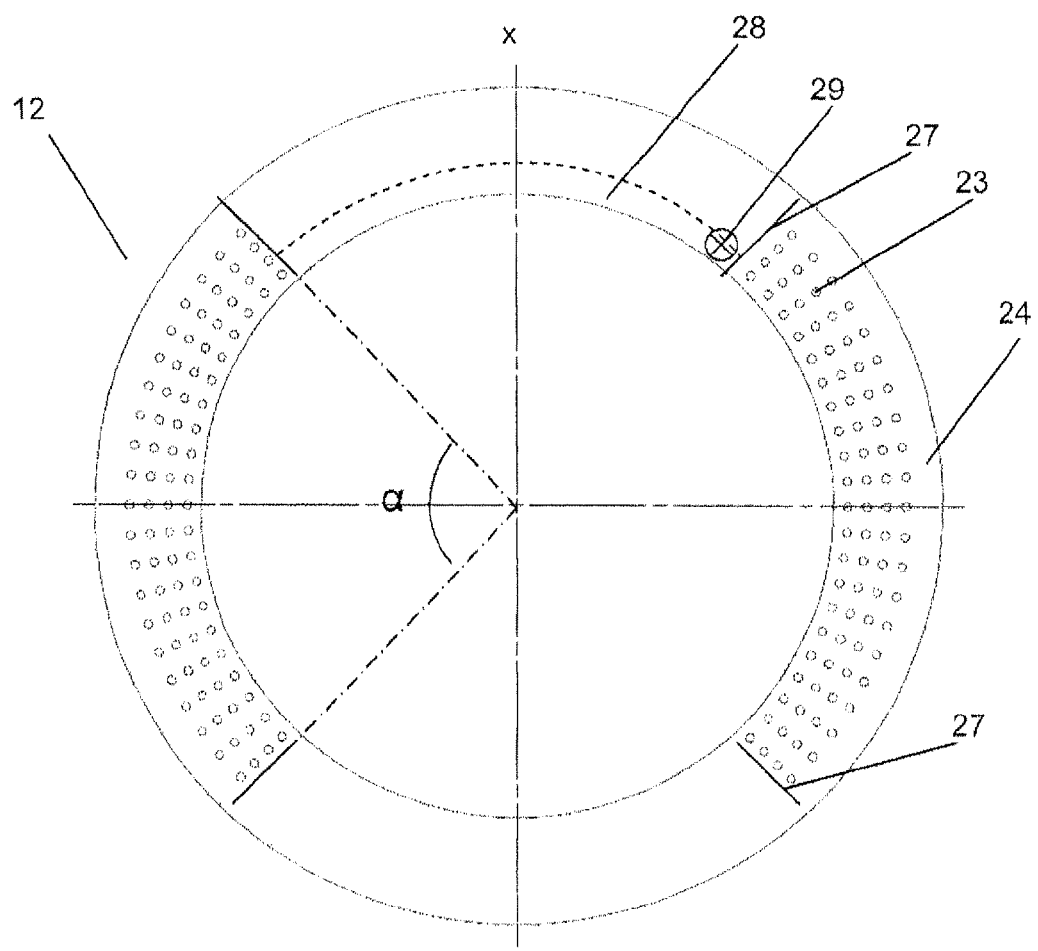

FIGS. 2b and 2c show how the duct 12 of FIG. 2a can be modified to affect, through the design of the duct lip, the shape of the flow field in the vicinity of the duct inlet 18 so that the flows into the duct about the upwind and downwind side lips can be made more symmetric. With this added symmetry of flow, which decreases the difference between the pressures Pu and Pd and hence decreases also the difference between the lift forces Fu and Fd, the roll moment M is reduced accordingly adding the benefit of increased resistance of the ducted fan vehicle to side airflows.

FIG. 2b is a cross section of a preferred embodiment of the present invention showing the upper, substantially annular duct inlet lip connecting inner and outer wall portions of the duct at both upwind and downwind sides modified to include perforations 23 through which air can pass in both directions from outside the lip inwards and from inside the lip outwards. At both upwind and downwind sides the space of the duct wall below the lip is enclosed into a closed chamber 24 by dividers 26 and 27 (27 shown in FIG. 2c), and at least a tube 28 connects the two chambers 24 enabling airflow between them at both directions such that the outcome is a compartment comprising of the two chambers and the tube with all its parts having substantially the same inside pressure, as air is sucked from high pressure to low pressure zones to reach equilibrium. Because the lips are perforated, chambers 24 are not closed hermetically allowing air to flow through perforations 23 in both directions between the inside and the outside of the chamber, i.e. the inside and outside of the lip, and thereby, through the compartment's unified pressure mentioned hereinabove, causing the surface pressures at both upwind and downwind lips to substantially equalize, hence significantly reduce the corresponding forces and rolling moment M shown in FIG. 2a hereinabove.

FIG. 2c is a top view of the perforated duct 12 (air mover and rotor not shown) wherein the upwind and downwind chamber sections are determined by angle α between barriers 27. Angle α is typically between 60° to 120° because the contribution of lift forces generated at lip surface close to the X axis of the duct, i.e.: at α>120°, to the roll moment is of lesser significance. The dimensions and shape of Tube 28 are designed to accommodate the airflow at given lip perforation geometry (perforation area X number of perforations=total airflow area) calculated at maximum rotor performance and relative side wind velocity. The flow between the chambers 24 can be controlled or stopped by at least one gate 29 located in the tube-chambers compartment operative by mechanical, electric, hydraulic or pneumatic means such for example as valves, flow regulators, servomechanism, etc. It should be appreciated that the perforations can be of various shapes, sizes and configurations. They can be individual holes or matrix of holes drilled in the lip surface or be a mesh type layer comprising part of the lip. In one exemplary but nonlimiting disclosure the perforations can be operative to control airflow, achieved by opening and closing the perforations or part of them by curved screens that can slide over the duct lip to cover or uncover the perforations. It should be appreciated that the perforations 23 in the duct inlet lips must comprise of a relatively large number of small holes so as not to alter significantly the smoothness and shape of the lips themselves which alteration may have a detrimental effect on the flow of air into the duct.

Figure 2D:
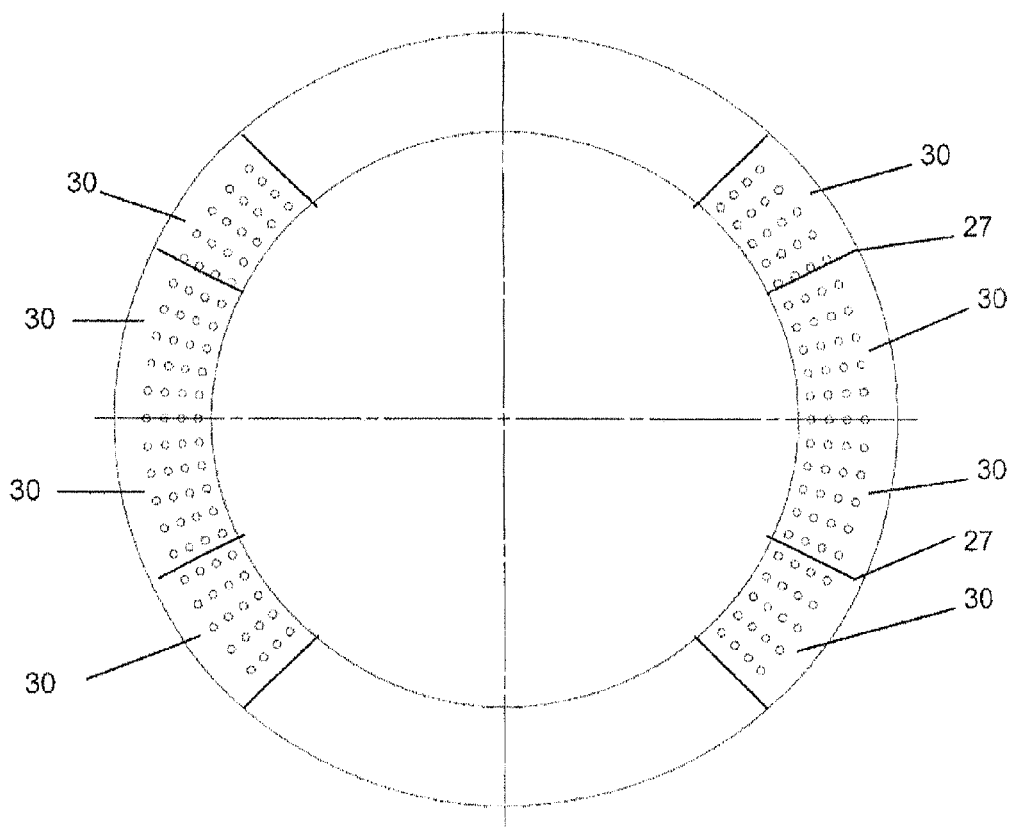

In another preferred embodiment illustrated in FIG. 2d it is possible to have more than a single chamber at each duct side and also to have multiple connecting tubes. In an exemplary but nonlimiting implementation of the disclosed technology, the perforations are divided into clusters (or groups) 30 each group covers a separate chamber wherein the counter side chambers are connected by separate tubes 28 (not shown). This configuration is especially advantageous when only partial pressure equalizing is needed and the opening and closing of the perforations can be controlled by individual groups or multiple groups combined together. The location on the duct lip, geometry, size, quantity and type of perforations for each group is determined according to aerodynamic and engineering design considerations. It should be appreciated that by dynamic opening and closing the perforations or part of them hence affecting pressures at desired duct sides it is also possible to control the vehicle, especially enhance the control power in roll, or in other axes if they are provided with a similar lip perforations system.

It should be also appreciated that the chambers described hereinabove may comprise of the whole inside hollow wall of the duct without installing a lower divider 26 as a bottom floor to separate between the chamber and the rest of the wall interior. Also, as the perforations expose the compartment or the duct wall interior to outside rain, dust, debris, etc, in another preferred embodiment of the invention, the perforations are protected by filters or separators that prevent dust and the like from entering the chambers, or alternatively sort them to be removed by opening and cleaning or purging the chambers. Rain water that penetrates the perforations is removed by drains or by valves installed at the bottom of the chambers or the hollow duct walls. Their mechanism of operation and control must have air pressure protection device in order to allow drainage of water without escape of air, avoiding undesired change in the inside pressure of the compartment. Since the ducted fan vehicle alters its positions and inclination angles during flight, it is advantageous to install a plurality of water drains at critical 'deepest' locations. In another preferred embodiment of the present disclosure air is blown continuously through the perforations from inside to outside the lip, for example by means of a compressor, air pump, scoops collecting external air or by using bleed air from the engine, thereby maintaining sufficient positive air pressure inside the chambers to prevent outside bodies from entering the holes keeping the chambers clean, and also providing for an even pressure at both upwind and downwind lips.

Figure 3A:
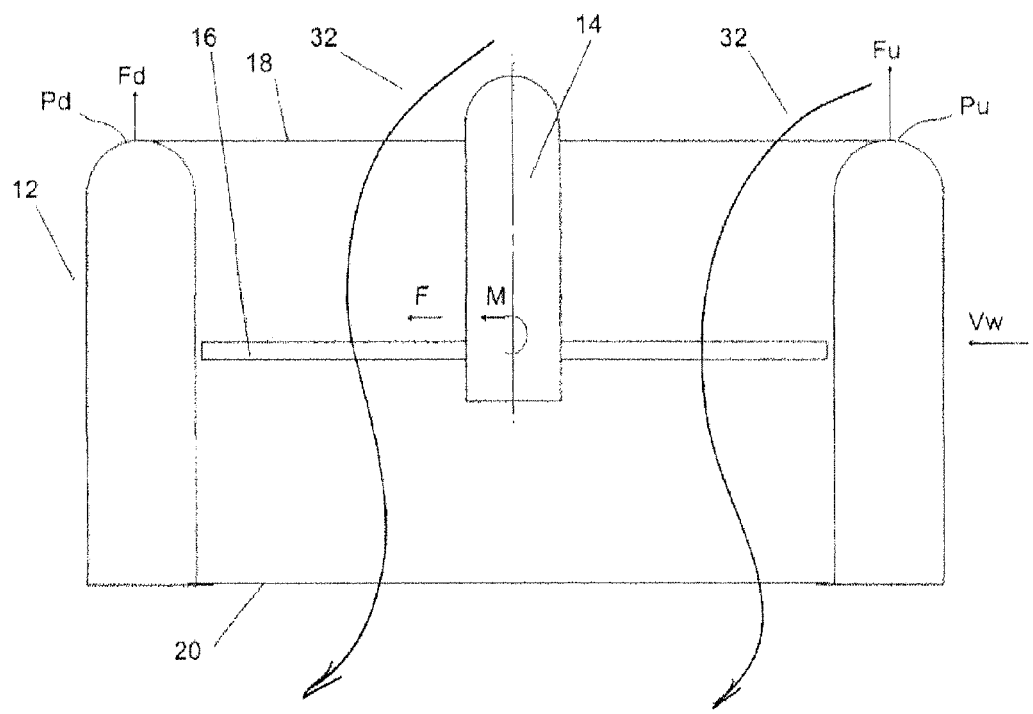
FIGS. 3a-3b are cross sections of flows at ducted fan units with and without vanes.

FIG. 3a shows schematically a cross section through the ducted fan 12 of the VTOL vehicle of FIG. 1d mentioned hereinabove but without the openings 50 in the duct walls. It also shows schematically the typical flow pattern that exists outside and inside a ducted fan when the VTOL vehicle encounters side wind flow Vw either due to its motion sideways and or due to side wind blows. The change in flow direction that is apparent in streamlines 32 from the entrance to the exit of the duct creates a momentum drag phenomena which causes moment M and force F to develop. Furthermore, the airflows create asymmetric air velocities and pressures on the inlet duct lips wherein the upwind side pressure Pu is smaller in magnitude than the downwind side pressure Pd due to more air suction at the upwind side, yielding corresponding lift forces Fu and Fd and thereby introducing inducing velocities which affect the downward flowing air streamlines in the duct. The asymmetric lift forces hence asymmetric induced velocities cause the air streamlines 32 flowing downward from the inlet lip to the outlet end of the duct to bend inside the duct inclined towards the upwind side, however as they reach the bottom outlet they become exposed to the external wind and bend to substantially align with the direction of the wind.

Figure 3B:
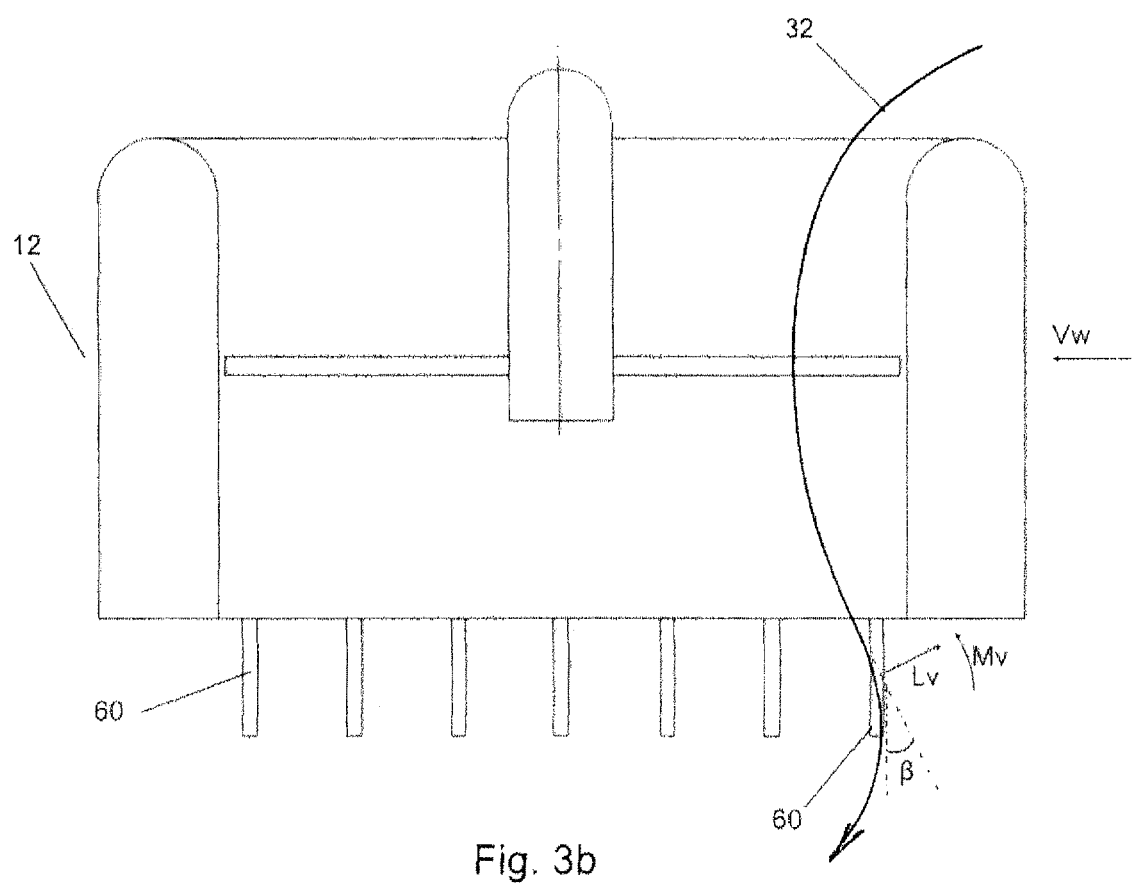

FIG. 3b illustrates the duct of FIG. 3a mentioned hereinabove with vanes 60 added to it about the outlet side. Typically vanes affect the airflow thus the controllability of the ducted fan vehicle. Due to the bending of the airflow as described in FIG. 3a, it impinges on the vanes 60 at an angle β yielding a lift force Lv acting on the vanes. The lift force Lv which is generated at distance from the roll axis of the duct located above the vanes creates a roll moment Mv which adds to the momentum drag causing an additional detriment compared to the situation without vanes installed. It should be appreciated that similar additional moments can be created also by bodies and elements other than vanes such for example as engine, transmission, landing gear, or other components of the vehicle as long as their shape and position may influence or interfere with the airflow at the exit side of the duct.

Figure 4A:
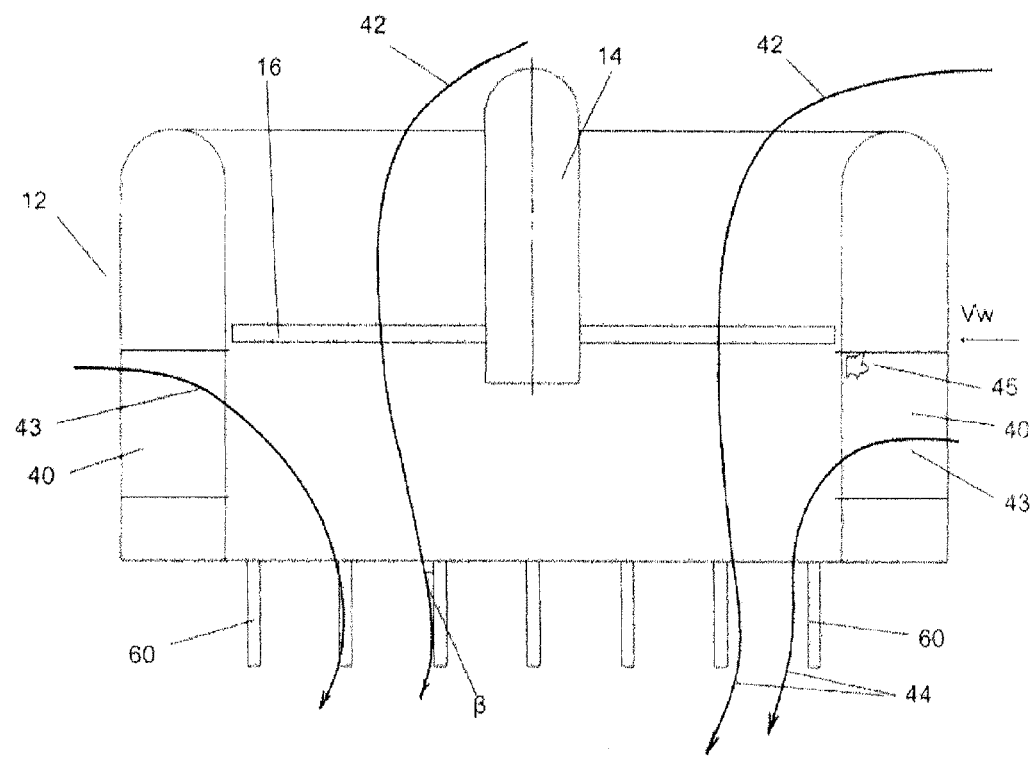
FIGS. 4a-4c illustrate openings in the lower side walls of the ducts.

FIG. 4a illustrates an exemplary but non-limiting embodiment of the invention, showing the ducted fan 12 of FIG. 3b with openings 40 installed at the lower side walls of the duct. Airflow streamline 43 schematically represents flow pattern from outside to inside the duct through the openings 40 wherein the difference between the patterns of streamline 43 at the upwind and downwind sides occurs due to their merging with external wind and with downwards rotor air blowing 42. Typically, a flow separation occurs about places like corner 45. The interaction of downward streamlines 42 with streamlines 43 emerging from the openings 40 yields shifted resultant streamlines 44 which are more parallel having a smaller angle β relative to the vanes compared to the streamline profile and angle β described in FIG. 3b, thereby reducing the lift force Lv and the rolling moment Mv respectively. It should be appreciated that besides their beneficial influence on the vanes by reducing Lv and Mv, one another advantage of designing the said openings at the lower part of the duct wall, is minimizing the loss in lift augmentation compared to the loss that occurs when the openings are located at upper parts of the duct closer to the inlet lip.

Figure 4B:
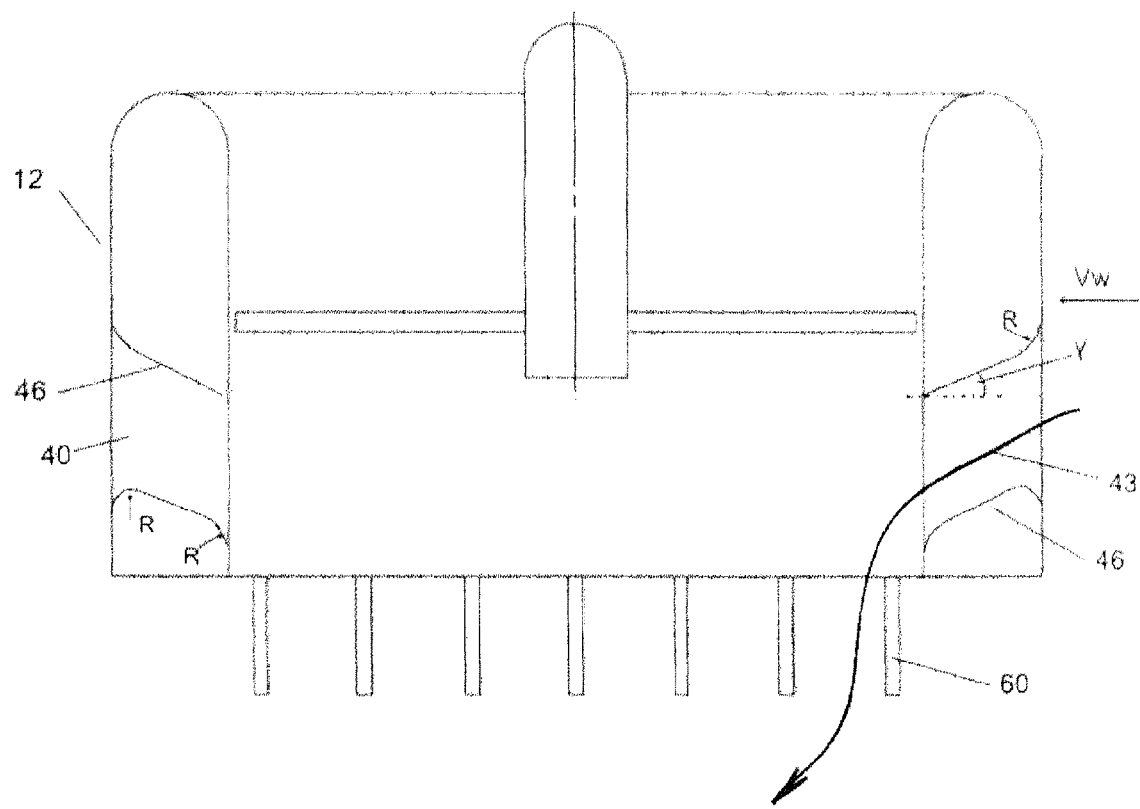
Figure 4C:
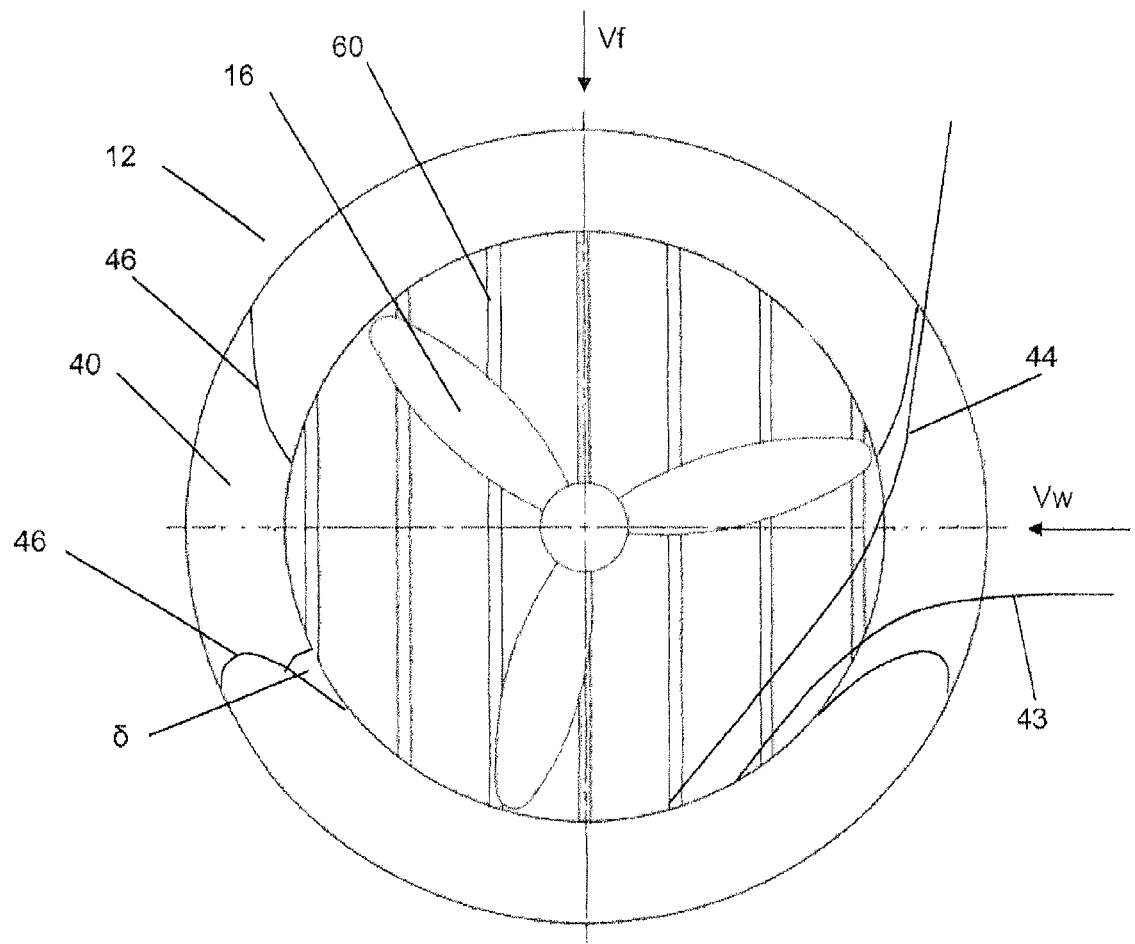

FIG. 4b-c schematically illustrate another exemplary but non-limiting embodiments of the present invention showing cross sections of inclined openings and rounded wall corners designed in order improve alignment with the through airflow streamlines. FIG. 4b illustrates a cross section of openings 40 with their surfaces 46 inclined at angle γ substantially parallel to the anticipated air streamlines in the opening, and having various radii R at the wall corners, designed according to common design practice of ducted fan lip curvature relative to the dimensions of the duct which, as has been discovered, provide for improved airflows 43 in the duct. FIG. 4c illustrates a top cross section of a forward facing duct of ducted fan vehicle 10 similar to the vehicle described in FIG. 1a with rotor 16 and lower vanes 60 moving forward facing wind velocity Vf where the inclinations δ and corner radii R of surfaces 46 are substantially similar in principle to those described in FIG. 4b hereinabove, but designed also in consideration of forward facing wind resulting an even further adjustment of the shape of the wall openings to aerodynamic flow regimes shown schematically as air streamlines 43 and 44. It should be appreciated that the tilted surfaces and wall lip radii design principles as described for the forward duct hereinabove, are similarly applicable also for the aft duct of the vehicle, which further improve the overall air flows inside and along the vehicle, thus its overall flight performances.

It has been also found that for the given ducted fan geometry the downwind side opening in the duct wall is significantly more effective in reducing the rolling moment than the opening in the upwind side, and consequently it would be advantageous to keep only the downwind opening without an upwind one because this will enhance the lift augmentation of the duct. However, since side wind is expected to blow from both directions depending on flight route and conditions, it is necessary to keep the upwind opening as well since, as understood, each opening can be at certain times either in the upwind or at the downwind side. Therefore, in another preferred embodiment the openings can be either fully or partially opened or closed adjusting to the sustaining flight and wind directions and conditions, preferably be closed when facing the upwind side and opened when facing the downwind side. This is achieved by installing closures at the openings that can be adjusted by servo, hydraulic or other common mechanisms and controlled either manually or programmed to change according to wind and flight conditions receiving feedback from wind velocity or pressure sensors or the like or actuated automatically by a spring or another device. The closures can be comprised of a sliding cover or arch made as one part or as a plurality of parts, or of spaced vanes, louvers or airfoils placed at the opening and turned between open and closed positions. It should be appreciated that for better performance the closures and their mechanisms are preferably designed such that when in fully closed position they substantially align as possible with the inner and outer planes of the duct in order to prevent aerodynamic flow disturbances at the duct.

Figure 5:
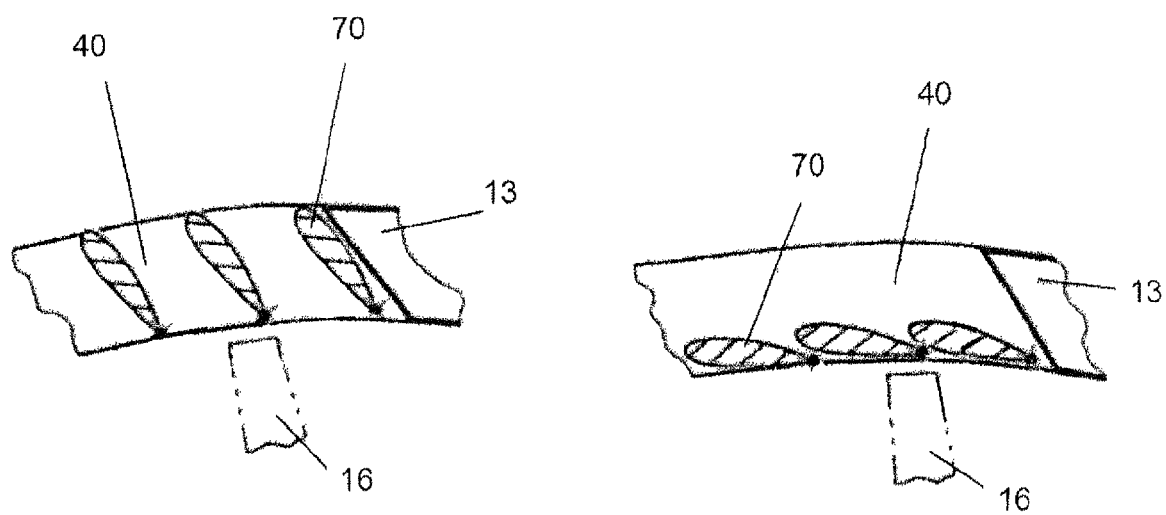
FIG. 5 illustrate blinds or closures installed in the duct wall opening.

FIG. 5 schematically illustrates an exemplary but non limiting embodiment of the invention, showing a section of duct wall 13 with blinds (or closures) 70 pivotally installed in opening 40 rotatable between open and closed positions. When the blinds are open air can flow through opening 40 into the duct and merge with the air blown downward by rotor 16. When in closed position the blinds act as a wall preventing through airflow. It should be appreciated that the forces produced on the blinds (which may be airfoil-shaped) when in various open positions can add control power to the vehicle mainly in yaw. In another preferred but non limiting embodiment of the invention the openings are closed by sliding curved plates which slide over the openings from open to closed positions.

One another advantage of the blinds installed on the wall opening is their protection ability against accidental contact with the rotating rotor blades which may be fatal. In another preferred embodiment of the invention, when blinds are not installed or they are not fit to protect against accidents, the openings 40 may be covered with protectors (not shown) aimed to prevent accidental contact between the rotors and persons or objects. The protectors may be made for example of strong bars, rods, rails, net or the like made of metal or composite materials with their spacing designed to prevent injury and damage but allow a relatively free airflow.

It should be appreciated that the configuration of the perforations and side wall openings and their performances as disclosed hereinabove may vary to other preferred embodiments, for example, they can be combined together or with other means to reduce roll moment such for example as tilting of the vanes at the inlet or outlet ends of the ducts to asymmetrically block partial airflow in the duct. Since in most cases winds do not blow exactly parallel to the lateral or the longitudinal axes of the ducted fan vehicle, their streamlines cause merged roll and pitch moments rather than pure roll or pure pitch. Therefore, it should be further appreciated that the side walls openings described hereinabove can be combined with openings at the forward and aft walls of the duct, or of the ducted fan vehicle such for example as openings 54 described in FIG. 1c. This combination extends the overall resistance of the vehicle to winds blowing from substantially all directions creating mixed pitch and roll moments.

In another preferred embodiment of the present disclosure, the openings 54 described in FIG. 1c can be divided into two sections, one upper above the rotor level and the other lower below it. This enables combining the lower section which is close to the duct outlet with the side openings described hereinabove without interfering with the opening at the upper section. In the example shown in FIG. 5 hereinabove the division of the opening into two sections can be achieved by splitting the blinds 70 into two parts, upper and lower, each part operative separately from the other part treating the corresponding upper and lower sections.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:
1. A ducted fan for a VTOL vehicle comprising:
a substantially cylindrical duct having an inlet at an upper end and an outlet at a lower end, and an air mover unit located within said substantially cylindrical duct;
wherein said substantially cylindrical duct includes inner and outer wall portions and a substantially annular upper lip connecting said inner and outer wall portions, said substantially annular upper lip defining said inlet and having opposed fore and aft portions and opposed side portions;
said peripheral lip provided with at least first and second openings, respectively, at each of said opposed side portions of said substantially annular upper lip, said first and second openings permitting flow of air into at least first and second chambers formed within said duct, said first and second chambers connected by at least one passageway to thereby enable substantial equalization of surface pressures at said opposed side portions of said substantially annular upper lip; wherein said at least one passageway is gated to control air flow between said first and second chambers.
2. The ducted fan of claim 1 wherein each of said first and second chambers extend angularly about said substantially annular lip between about 60° and 120°.

3. The ducted fan of claim 1 wherein said first and second openings are adjustable to control air flow into said first and second chambers.

4. The ducted fan of claim 1 wherein said at least first and second openings comprise first and second arrays of apertures.

5. The ducted fan of claim 3 wherein said first and second arrays of apertures comprise perforations.

6. The ducted fan of claim 1 wherein said at first and second chambers comprise plural chambers for each of said first and second arrays of apertures.

7. The ducted fan of claim 6 wherein each of said plural chambers of said first array of apertures are connected to corresponding ones of said plural chambers of said second array of apertures.

8. The ducted fan of claim 1 wherein water drains are provided in each of said first and second chambers.

9. The ducted fan of claim 1 wherein means are provided for blowing air through said first and second openings from inside said first and second chambers.

10. A method of reducing roll moment experienced by a ducted fan VTOL vehicle comprising:

providing a substantially cylindrical duct having an inlet at an upper end and an outlet at a lower end;

locating an air mover unit within said substantially cylindrical duct;

providing said substantially cylindrical duct with inner and outer wall portions and a substantially annular upper lip connecting said inner and outer wall portions, said substantially annular upper lip defining said inlet and having opposed fore and aft portions and opposed side portions;

providing said peripheral lip with at least first and second openings, respectively, at each of said opposed side portions of said substantially annular upper lip;

permitting with said first and second openings flow of air into at least first and second chambers formed within said duct; and connecting said first and second chambers by at least one passageway to thereby enable substantial equalization of surface pressures at said opposed side portions of said substantially annular upper lip; and controlling air flow between said first and second chambers by gating said at least one passageway.

\* \* \* \* \*